United States Patent [19]

Korte

[11] Patent Number: 4,638,585
[45] Date of Patent: Jan. 27, 1987

[54] MOTORIZED FISHING DEVICE AND METHOD

[76] Inventor: Gerald A. Korte, 14330 Regis St., Brookfield, Wis. 53005

[21] Appl. No.: 711,260

[22] Filed: Mar. 13, 1985

[51] Int. Cl.⁴ .............................................. A01K 97/00
[52] U.S. Cl. ..................................................... 43/26.1
[58] Field of Search ......................... 43/26.1, 26.2, 4.5

[56] References Cited

U.S. PATENT DOCUMENTS

| | | | |
|---|---|---|---|
| 2,693,047 | 11/1954 | Lumsden | 43/26.1 |
| 2,804,712 | 9/1957 | Jackson | 43/26.1 |
| 3,149,435 | 9/1964 | Nordeen | 43/26.1 |
| 3,739,516 | 6/1973 | Holling | 43/26.1 |
| 3,758,975 | 9/1973 | Curtis | 43/26.1 |
| 4,442,621 | 4/1984 | Kent | 43/26.1 |

FOREIGN PATENT DOCUMENTS 699743  12/1964  Canada .................................. 43/26.1

*Primary Examiner*—Gene P. Crosby
*Attorney, Agent, or Firm*—William E. Mouzavires

[57] ABSTRACT

A motorized fishing device havin a body containing a motor, a power source preferably a battery, and a propeller driven by the motor for propelling the body through the water. A float, preferably a bobber, is attached to the body to stabilize it and keep it afloat while also indicating its position in the water. The body is equipped with means for mounting it to a fishing line to be movable along the line relative thereto upstream of a hook and sinker or other tackle located at the end portion of the line. The body additionally includes a releasable catch for fixing the line relative to the body so that initially, the body will feed out the line off a rod and reel as the body is propelled through the water. The catch may be released either by a striking fish or by the user applying tension to the line. Release of the catch allows direct feel through the line to a hooked fish and also may be also to change the depth of the hook and sinker in the water. The body also has a cage about the propeller to protect it from weeds or other vegetation in the water as well as entanglement by the line.

6 Claims, 6 Drawing Figures

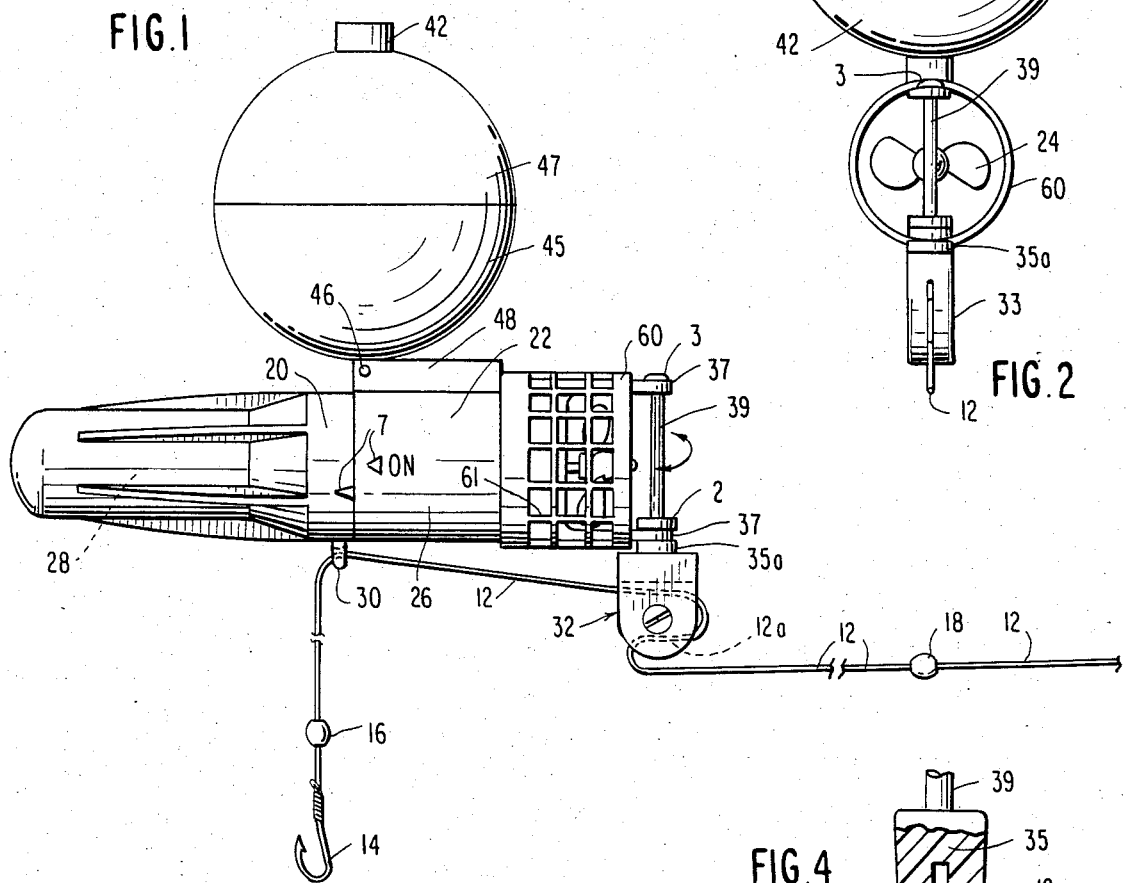
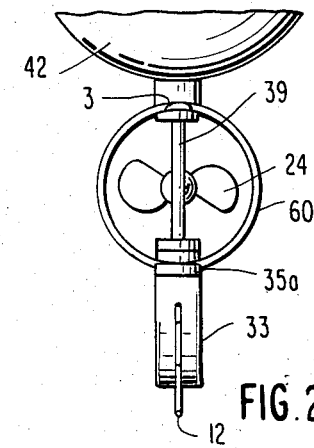
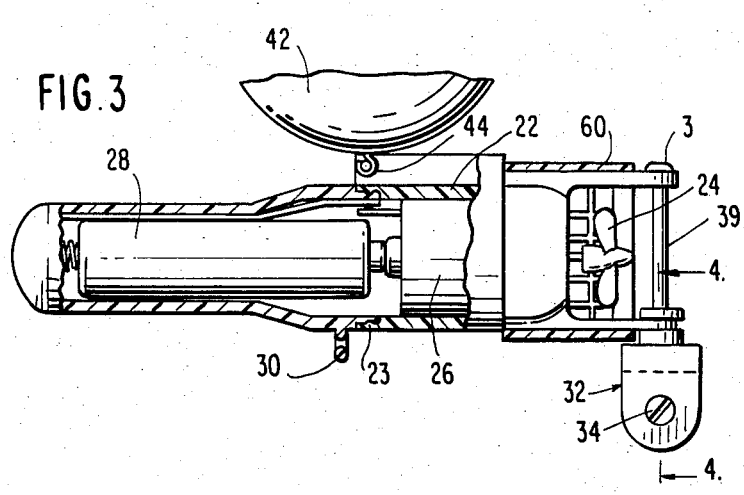
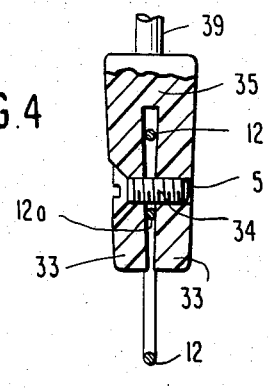
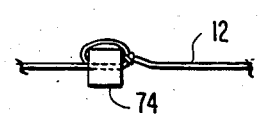
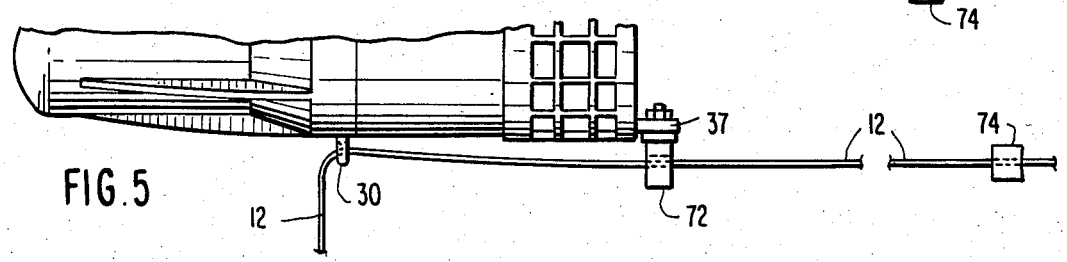

MOTORIZED FISHING DEVICE AND METHOD

BACKGROUND OF INVENTION

The present invention relates to motorized fishing devices which attach to fishing lines to feed the line out in the water to remote or other locations while the user remains on shore or in a boat. The prior art is filled with various such devices which typically include a body having a motor which drives a propeller. The fishing line is attached either to the motorized body or to the fishing line in the region of the motorized body to be propelled out into the water by the motorized body. Examples of such devices appear in U.S. Pats. No. 1,446,816 Taylor et al, U.S. Pat. No. 1,850,296 Vermeulen, U.S. Pat. No. 2,559,475 Sparkman, U.S. Pat. No. 2,693,047 Lumsden, U.S. Pat. No. 2,709,316 McCabe, U.S. Pat. No. 2,726,471 Uus, and U.S. Pat. No. 3,203,131 Myers. Some of the aforementioned patented devices are provided with a motorized body which is floatable, see for example, McCabe U.S. Pat. No. 2,709,316, while others are provided with special keels to stabilize the motorized body, see for example, Vermeulen U.S. Pat. No. 1,850,296 and Lunsden U.S. Pat. No. 2,693,047. In other devices, the motorized device is positioned on the fishing line downstream from a float such as a bobber, see for example, Taylor et al U.S. Pat. No. 1,446,816 and Sparkman U.S. Pat. No. 2,559,475.

In all such devices, however, the fishing line is fixedly attached to the motorized body which results in loss of sensitivity to the fish when a fish is being played while adding extra weight to the line during the play. Fixing the line directly to the motorized body also hinders the ability to hook the fish. In addition, the constant fixation of the line to the motorized device also prevents the fisherman from changing the depth of the tackle while the device is out in the water thus requiring the line and device to be reeled in to the fisherman in order to effect such change.

U.S. Pat. No. 2,803,914 to Ellis discloses a motorized body for carrying out a fishing line to a desired location in the water, whereupon the body is disengaged from the fishing line and returned to the fisherman. Once the fishing line is disengaged from the motorized device, it is no longer possible to relocate the fishing tackle to other areas in the water through the use of the motorized body unless, of course, the fishing line is reeled in to shore to be reconnected to the motorized device which must then be set out in the water to the new location. The Ellis apparatus is further complicated by requiring an extra line, that is, in addition to the fishing line, to reel out the motorized body and fishing line. In some of the other patented devices cited above, extra lines are utilized to deenergize the motor, thereby further complicating the apparatus as well as the fishing operation in general, see for example, Vermeulen U.S. Pat. No. 1,850,296, Lumsden U.S. Pat. No. 2,693,047 and McCabe U.S. Pat. No. 2,709,316.

OBJECTS OF THE PRESENT INVENTION

It is an object of the present invention to provide a novel and improved motorized fishing device which overcomes the abovementioned problems attendant conventional devices of the prior art. Another object is to provide a novel method of fishing utilizing a motorized fishing device for carrying out the fishing line to remote or other selectable areas of the water being fished.

Another object of the present invention is to provide a motorized fishing device that will carry a fishing line off a rod and reel to selected areas in the water and yet may be released from the line while in the water to allow relative movement between the line and the device for purposes of hooking and playing a fish caught on the line or for changing the depth of the fishing tackle. Included herein is such a device that, in use, always remains attached to the fishing line to allow it to be reeled in with the line.

A further object of the present invention is to provide such a motorized device that is uniquely stabilized against spinning and sinking while moving through the water to a desired destination. Included herein is such a device whose position in the water is readily visible through a float which also serves to stabilize the device as it moves through the water.

A still further object of the present invention is to provide such a motorized fishing device that will achieve the above objects while having a relatively lightweight, compact body and which may be easily used with a reel and rod without requiring any special skills on the part of the fisherman. Included herein is such a device that may be economically manufactured on a commercial basis from standardized or readily accessible parts and which will provide dependable service over relatively long periods of repeated use.

SUMMARY OF INVENTION

In summary, the fishing device of the present invention includes a motorized body having means for mounting the body to a fishing line to allow relative movement between the line and the body. The body is equipped with a catch or equivalent means for releasably fixing the body to the line against relative movement to thus allow the body to carry out the line off a rod and reel into a selected locale in the water to be fished. Tension applied to the line either intentionally by the fisherman or by a fish that has struck the hook will release the line from the catch to bypass the body and allow a direct feel to the fish through the line or allow the depth of the fishing tackle to be changed. In order to stabilize the device as it is propelled in the water, a float preferably a bobber, is attached to the device. In addition to governing the depth of the device in the water while preventing spinning of the device, the float also functions to indicate the position of the device and the associated fishing tackle in the water as well as when a fish strikes the hook causing a characteristic movement in the float at the surface of the water.

DRAWINGS

Other objects and advantages of the present invention will become more apparent from the following more detailed description taken in conjunction with the drawings in which:

FIG. 1 is a side elevational view of a motorized fishing device constituting a preferred embodiment of the present invention and shown with fishing tackle and a portion of a fishing line;

FIG. 2 is a fragmental, rear, elevational view of the device;

FIG. 3 is a view generally similar to FIG. 1 but with certain portions shown in longitudinal cross section, and other portions shown in fragment;

FIG. 4 is a cross-sectional view taken generally along lines 4—4 of FIG. 3;

FIG. 5 is a view generally similar to FIG. 1 but of another embodiment of the invention parts of which have been broken away for purposes of brevity; and FIG. 5A is a fragmental view of a portion of a fishing line containing a magnetic member utilized in the device of FIG. 5.

DETAILED DESCRIPTION

Referring now to the drawings in detail, there is shown in FIGS. 1 to 4, for illustrative purposes only, a motorized fishing device generally designated 10 constituting a preferred embodiment of the invention. As shown in FIGS. 1 to 3, the device includes a generally hollow cylindrical casing formed in two sections which include a front section 20 and a rear section 22. Front section 20 has a spherical nose at one end and is rotatably mounted at its other end on a rear section 22. The device 10 is driven through the water in the preferred embodiment by a propeller 24 mounted in the rear of the rear casing section 22. Propeller 24 is driven by a motor 26 also located in the rear casing section 22 as shown in FIG. 3; and a battery 28 is mounted in the front section for energizing the motor 26 upon actuation of an on-off switch. The latter is provided in the preferred embodiment through the front casing section 20 which, upon rotation relative to rear casing 22 in one direction, energizes the motor 26 and, upon rotation in the opposite direction, deenergizes the motor 26. As shown in FIG. 1, the casing sections are provided with suitable indicia 7 of the on or off position of the motor. The casing sections 20, 22 have mating internal flanged rings shown at 23 in FIG. 3 which have a snap fit and allowing the casing sections to be separated in order to replace the battery 28. As described thus far, the casing sections, the battery, motor and propeller assembly are conventional and may be purchased on the open market. For example, one such commercially available device is made by MABUCHI and designated S-1 Submarine Motor. Therefore, a further description of the above parts is not believed to be necessary except to note that the overall length of the body 10 is on the order of about four and one half inches (4½"); and the battery 28 may be a 15 amp. 1.5 volt AA pen cell battery.

In accordance with the present invention, the device 10 is provided with means for mounting it to a fishing line shown as 12 at a location upstream of the fishing tackle which may include a hook 14 and sinker 16 shown in FIG. 1. Line 12 is wound at its opposite end about a conventional fishing reel (not shown) such as would be mounted on a conventional fishing rod. In certain embodiments, a stop such as a weight or bobber stop 18 or simply a knot in the line (not shown) may also be fixed to the fishing line at a location upstream of the device in order to limit the depth of the hook 14 in the water as will become clear from the description below. In the preferred embodiment shown, the device is so mounted to the line 12 by means of a simple eye 30 fixed to and depending from the casing, preferably the bottom of front section 20 adjacent its rear and generally in a vertical plane intersecting the longitudinal axis of the casing. As shown in FIG. 1, the line 12 is received through eye 30 with the tackle 14, 16 located downstream of the eye 30.

Further in accordance with the present invention, means in the form of a catch or any equivalent means, is provided, preferably upstream of the eye 30, for releasably fixing the line 12 relative to the device 10 to enable the device 10 to carry out the line 12 into the water when driven by the propeller 24. In the embodiment shown in FIG. 1, this means is in the form of a catch generally designated 32 including a pair of opposed catch members 33 spaced to receive and pinch a portion 12a of the fishing line to allow the device 10 to move with the fishing line 12, that is, without relative movement therebetween. In the specific embodiment shown in FIGS. 2 and 4, the catch may be formed by a bifurcated member of plastic or other suitable material having a crosspiece base 35 suspended from the bottom of the rear casing section 22 at the rear end thereof, and depending catch members 33 centered on opposite sides of the longitudinal axis of the casing so that the space between the catch members 33 is in alignment with the eye 30 rearwardly thereof. In order to adapt the catch 32 to different gauges of fishing lines or to change the strength of the catch to adjust the release sensitivity, means is provided for drawing the catch members towards or away from each, such means being screw 34 shown in FIG. 4 and received in aligned apertures in catch members 33 with the screw threads received in corresponding threads 5 formed in one of the members. As shown in FIGS. 1 and 4, the fishing line is threaded through the space between the catch members 33 above screw 34 and then brought under the screw 34 to be pinched by and between catch members 33. To release the line 12a from the catch, all that is required is a pull on the line either forwardly of the catch 22 such as would occur when a fish strikes the hook 14 or rearwardly of the catch such as would be effected by the fisherman as will be explained below. In the embodiment shown in FIGS. 1 to 4, it is necessary to reel in the device 10 in order to reset the line in the catch. However, in the embodiment of FIG. 5 to be described below, the catch may be reset while the device is in the water, that is, without requiring the device to be reeled in to the fisherman.

Inasmuch as the space above the screw 34 in the catch provides means for mounting the device to the line 12, in other embodiments (not shown) the eye 30 may be dispensed with; however, it is preferred that the eye 30 or equivalent mounting means be used in combination with the catch 32 to minimize tanglement of the line about the catch. Also, should the front casing section 20 become accidentally removed from the rear section 22 while in the water, the fact that the eye 30 is attached to the front section 20 will serve to keep the section 20 attached to the line thereby preventing loss of the front section 20.

In the specific embodiment shown, catch 32 may also serve as a rudder allowing the device to be steered in the water. For this purpose, the catch may be mounted to casing 22 for swivel movement about a vertical axis formed by the pivot 39 used to mount the catch to the casing 22. The latter mounting is effected through apertured arms 37 fixed to and extending rearwardly of the end of the rear casing section 22 to receive the pin 39 for swivel movement. As shown in FIGS. 1 and 2, the crosspiece 35 of the catch has a collar 35a fixed thereto, and the pin 39 is fixed in the collar below arm 37 to be rotatable with the catch 32. The top of pin 39 has a collar 3 fixed thereto above arm 37 to maintain pin 39 mounted within the arms 37. If desired, pin 39 may be provided with threads receiving a lock nut 2 which may be threaded against lower arm 37 to fix the pin 39 and catch 32 against rotation. However, when the lock nut 2 is released from lower arm 37, manipulating the line 12 to one side or the other will allow the fisherman to pivot the catch 32 about pin 39 to aid in steering the device. In addition to steering, the catch members 33 will also help to stabilize the device in the manner of a keel.

In order to govern the depth of the device 10 in the water as well as to stabilize and indicate its position in the water, a float preferably a bobber 42 of convention construction is attached to the device. In the preferred embodiment, the float 42 is attached to the top of the device generally above the center of gravity thereof and 180 degrees opposite the location of the eye 30. Where a conventional bobber is used as shown, the hook 44 of the bobber plunger 42 is engaged about a cross pin 46 fixed between opposite upstanding walls 48 of the rear casing section 22. The plunger 42 is spring loaded so that when released, the hook will be securely engaged about pin 46 with the float body 45 engaged against the top of walls 48 of the casing section 22. To remove and replace the bobber 40 with a larger or smaller one, the plunger 42 is simply depressed allowing the hook 44 to be released from pin 46. The bobber body is, of course, floatable and therefore will determine the depth below the water at which the device 10 will operate during which its position will be indicated by the upper body portion 47 of the bobber which will appear on the surface of the water. Moreover, the weight of the device 10 below the bobber 40 will constantly urge the bobber down in the water to a certain degree so that it will be extremely sensitive to fish strikes on the hook 14 which will cause visible movement of the bobber. The bobber 40 will also stabilize the device 10 preventing spinning movement thereof as it is propelled through the water.

Inasmuch as the propeller 24 is located in a recess in the rear of rear casing section 22, it will be protected to a certain degree from entanglement with the fishing line 12 and vegetation such as weeds in the water. In order to further protect the propeller 24 from such matter, it is preferred that a cage 60 be mounted about the end of rear casing section 22. Cage 60 may take the form of a lightweight apertured sleeve made of plastic or other suitable material and slid onto the rear casing section 22 about arms 37 forwardly of catch 32 which may also serve to hold the cage in position. The apertures in the cage are indicated at 61 in FIG. 1.

In use of the device, and assuming it is mounted to line 12 as shown in FIG. 1 with the line engaged in the catch 32, the fisherman rotates the front casing 20 to switch the motor on, the device is then placed into the water and directed to a selected location, whereupon it will carry out the line off the rod and reel as the casing moves just below the surface of the water with the bobber riding along the surface visible to the fisherman, it being understood that the reel will be released to allow free unwinding of the line in response to the propulsion of the device through the water. The depth of the hook 14 in the water will be determined by the point 12a at which the line was engaged in the catch and this, of course, may be selected as desired before the device is placed into the water. When the device has carried the hook to the selected area to be fished, the reel is engaged to stop unwinding of the line. The motor will continue to operate and produce a buzzing sound that is desired in order to attract the fish. The strength of the motor 26 and the propeller size are designed in relation to the strength of the catch 32 so that, although the motor continues to operate as the reel on the rod is held fixed, the pulling force produced on the line by the device will not be strong enough to overcome the catch and release the line at portion 12a. Should a fish strike the hook 14, this will cause the bobber 40 to noticably move in the water, whereupon the fisherman will set the hook in the fish and then pull the line to release the line from the catch 32, whereupon a direct connection through the line to the fish will be established allowing the fish to be hooked and played with sensitivity and without undue interference from the device. The fish may then be reeled in with the line which will also carry the device 10 back to the fisherman to be reset for the next operation. When the line is being reeled in, the device 10 will remain on the line as the sinker 16 is larger than the hole in eye 30. It is also possible that a fish striking the hook with sufficient force may also cause release of the line from the catch 32, whereupon the fisherman may proceed to play the fish and reel it in with the device as described above.

During the above operation, should the fish escape from the hook, the fisherman may continue to fish with the device without the need of reeling in the device. In this phase of operation, the device will be free to move along and relative to the line and vice versa. The bobber stop 18 and the sinker 16 will, however, determine the opposite limits of relative travel between the line 12 and the device. Should the fisherman wish to fish in a different area, he may either reel in the line or release the reel and allow the device to propel the line out further as the sinker 16 pulls the line off the reel. Once the desired fishing location is reached, the reel is stopped by the fisherman and the travel of the device will come to a stop with the eye 30 engaged against the sinker 16. The motor 26 will, of course, continue to operate making a buzzing sound for attracting fish. It will also be seen that the above process may be utilized to change the depth of the hook once the catch 32 is disengaged from the line 12.

Referring now to FIGS. 5 and 5a, there is shown a modification of the device employing a magnetic catch in place of the mechanical catch 32 employed in the above-described embodiment. The magnetic catch includes a fixed magnetic member 72 fixed to the rear end of the rear casing section 22 at the bottom thereof, and a movable magnetic member 74 fixed to the fishing line 12 rearwardly of the fixed member 72. The movable magnetic member 74 has a central aperture receiving the line 12 and may be fixed to the line in any suitable manner. Moreover, to allow adjustment of the position of magentic member 74 along the line to vary the fishing depth, the magnetic member 74 may simply be knotted in position by a portion of the line as illustrated in FIG. 5A. At the beginning of a fishing operation, the fisherman will position the hook 14 and sinker 16 a selected distance from the movable catch member 74 to predetermine the desired depth of the hook in the water. The line 12 is then run through the eye 30 to engage the catch members 72 and 74 thereby fixing the device to the line against relative movement. When the device is energized and placed into the water, the line will be carried out by the device once the reel is released by the fisherman. To release the catch when a fish strikes or when it is desired to change the depth of the hook in the water, the line 12 is merely pulled producing tension separating the magnetic members 72, 74 and allowing hooking action and direct feel to the fish or allowing relative movement between the device and the line to change the depth of the hook. In contrast to the catch 32 incorporated in the above-described embodiment, the magnetic catch has the advantage of allowing the catch members 72, 74 to be reengaged while in the water to return the hook 14 to the original predetermined depth, that is, without requiring the device to be reeled in and out of the water. The latter may be accomplished by selecting a sinker 16 of appropriate weight that will drag the line 12 (once the reel is released) forwardly relative to the device until the magnetic members are reengaged. In the presently described embodiment, the movable catch member 74 also takes the place of the stop 18 which may be employed in the embodiment of FIG. 1. If desired, a rudder (not shown) may be mounted to and between the arms 37 in the embodiment of FIG. 5.

It will be appreciated that other types of catches, in addition to those shown and described, may be employed in keeping with the invention. Additionally, other modifications will become readily apparent to those of ordinary skill in the art without departing from the scope of the invention which is indicated in the claims below.

what is claimed is:

1. A fishing device comprising in combination,
   a body,
   means for propelling the body in the water,
   means for mounting the body to an associated fishing line for movement relative to each other,
   means including a catch for releasably fixing the body to the associated line to permit the body to feed out the line in the water upon propulsion of the body in the water, said means being releasable to permit the body and the associated line to move relative to each other while the body remains mounted on the line,
   indicia means connected to the body for indicating the location of the body while in the water,
   and wherein said catch is constructed such that when the line is released from the catch the line is movable relative to the body without interference from the catch,
   and wherein said indicia means includes a float connected to the body,
   and wherein said body has an upper portion including a mounting means and said float is attached to said mounting means such that the body extends longitudinally below the float.

2. A fishing device comprising in combination,
   a body,
   means for propelling the body in the water,
   means for mounting the body to an associated fishing line for movement relative to each other,
   means for releasably fixing the body to the associated line to permit the body to feed out the line in the water upon propulsion of the body in the water, said means being releasable to permit the body and the associated line to move relative to each other while the body remains mounted on the line,
   indicia means connected to the body for indicating the location of the body while in the water,
   and wherein said indicia means includes a float connected to the body, said body has an upper portion and said float is attached to said upper portion such that the body extends longitudinally below the float, and said float is a bobber having a depressible hook and said upper portion of the body has means releasably receiving the depressible hook of the bobber.

3. A fishing device comprising in combination,
   a body,
   means for propelling the body in the water,
   means for mounting the body to an associated fishing line for movement relative to each other,
   means including a catch for releasably fixing the body to the associated line to permit the body to feed out the line in the water upon propulsion of the body in the water, said means being releasable to permit the body and the associated line to move relative to each other while the body remains mounted on the line,
   indicia means connected to the body for indicating the location of the body while in the water,
   and wherein said catch is constructed such that when the line is released from the catch the line is movable relative to the body without interference from the catch,
   and wherein said catch also forms a rudder.

4. The fishing device defined in claim 3 wherein said mechanical catch includes opposing catch members for engaging opposite sides of the associated line.

5. The fishing device defined in claim 4 wherein said catch includes means for adjusting the distance between said opposing catch members.

6. A fishing device comprising in combination,
   a body,
   means for propelling the body in the water,
   means for mounting the body to an associated fishing line for movement relative to each other,
   means for releasably fixing the body to the associated line to permit the body to feed out the line in the water upon propulsion of the body in the water, said means being releasable to permit the body and the associated line to move relative to each other while the body remains mounted on the line,
   indicia means connected to the body for indicating the location of the body while in the water,
   and wherein said means for releasably fixing the body to the associated line is a mechanical catch depending from a lower part of the body at a rear end portion thereof, said catch being rotatable about a vertical axis relative to the body thereby also serving as a rudder.

* * * * *